(12) United States Patent
Shiau et al.

(10) Patent No.: US 8,432,628 B2
(45) Date of Patent: Apr. 30, 2013

(54) OPTICAL FILM

(75) Inventors: Tzeng-Ke Shiau, Hsin-Chu (TW);
Chao-Hung Weng, Hsin-Chu (TW);
Wei-Chung Chao, Hsin-Chu (TW);
Chang-Cheng Liu, Hsin-Chu (TW);
Bih-Chang Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 169 days.

(21) Appl. No.: 13/042,468

(22) Filed: Mar. 8, 2011

(65) Prior Publication Data
US 2011/0267694 A1 Nov. 3, 2011

(30) Foreign Application Priority Data
Apr. 30, 2010 (CN) .......................... 2010 1 0170468

(51) Int. Cl.
*G02B 5/04* (2006.01)
*G02F 1/1335* (2006.01)
(52) U.S. Cl.
USPC ............................................ 359/831; 349/62
(58) Field of Classification Search ........................ None
See application file for complete search history.

(56) References Cited

U.S. PATENT DOCUMENTS 3,293,331 A * 12/1966 Doherty ........................ 264/1.31
6,845,212 B2    1/2005 Gardiner et al.
7,278,771 B2   10/2007 Campbell
2008/0088933 A1  4/2008 Lin
2009/0311486 A1 12/2009 Kim et al.

FOREIGN PATENT DOCUMENTS

| TW | I274896 | 3/2007 |
|---|---|---|
| TW | 200712655 | 4/2007 |
| TW | 200811479 | 3/2008 |
| TW | I302989 | 11/2008 |
| TW | 200907397 | 2/2009 |
| TW | 200912390 | 3/2009 |
| TW | M352033 | 3/2009 |

* cited by examiner

*Primary Examiner* — Jade R Chwasz
(74) *Attorney, Agent, or Firm* — Jianq Chyun IP Office (57) ABSTRACT

An optical film includes a light transmissive substrate having a first surface and a second surface opposite thereto, strip protrusions on the first surface, and protruding structures on crest lines of the strip protrusions. Each strip protrusion has two strip surfaces. Each protruding structure has a protruding end protruding from the crest line of the corresponding strip protrusion and two wing portions on the strip surfaces of the corresponding strip protrusion. Each wing portion extends from the protruding end to a place between the crest line and a valley line. A length of the protruding structure parallel to an extension direction of the crest line is L, a width of the protruding structure perpendicular to the crest line is W, and L/W≧1.2. At least one of a moiré phenomenon, a local adherence phenomenon, a scratching phenomenon, and a wearing phenomenon with other optical devices is effectively mitigated.

18 Claims, 6 Drawing Sheets

OPTICAL FILM

CROSS-REFERENCE TO RELATED APPLICATION

This application claims the priority benefit of China application serial no. 201010170468.7, filed on Apr. 30, 2010. The entirety of the above-mentioned patent application is hereby incorporated by reference herein and made a part of this specification.

BACKGROUND OF THE INVENTION

1. Field of the Invention

The invention relates to an optical film.

2. Description of Related Art

With advancement in optoelectronic industries in the recent years, requirements for shape of an exit beam from a light source module have gradually increased. Accordingly, various types of optical films have been developed to comply with the requirements for the beam shape. These optical films include diffusion sheets and brightness enhancement films (BEFs) such as prism sheets, lens arrays, and so on. More specifically, a prism sheet acting as a BEF employs light emitting prism surfaces of a plurality of rod-shaped prisms to select among incident light rays in different incident directions. Typically speaking, a light beam entering a bottom portion of the rod-shaped prism at an angle of approximately 60° passes through the prism due to refraction effects of the rod-shaped prism, and this beam exits out of the prism in a direction approximately perpendicular to the bottom portion of the rod-shaped prism. Moreover, the light beam having an incident angle significantly greater than or smaller than 60° may not pass through the prism due to the total reflection effect of the light emitting prism surface. The light beam is reflected by the prism back to an optical device located below the prism sheet and reused.

Accordingly, the prism sheet achieves a light condensing effect for configuring the exit light beam to be substantially forward-emitted.

However, a crest line at the top portion of the rod-shaped prism and a valley line formed between two adjacent rod-shaped prisms are clearly observable and disposed at a regular interval. Therefore, a moiré phenomenon easily occurs in a display panel (e.g. a liquid crystal display panel) disposed above the prism sheet or the BEF, thereby affecting the display quality of the display panel. Besides, the rod-shaped prism may form a sharp corner at the crest line, and the sharp corner is prone to be worn by or to scratch the adjacent optical devices. Additionally, since each of the rod-shaped prisms has the same height, the prism sheet may locally adhere to an adjacent optical film rather easily, thereby giving rise to local abnormalities in the displayed image.

Taiwan Patent No. 1302989 discloses an optical film having a transparent substrate, a structural layer, and a plurality of light guide units. The structural layer may be a light condensing unit (e.g. a prism structure) disposed on the transparent substrate. The light condensing unit has a peak line and two surfaces. The light guide units are disposed on the peak line or the two surfaces. The light guide units may have a tapered shape, a circular arch shape, a circular arc shape, or a prism shape.

Furthermore, Taiwan Patent No. M352033 discloses an optical film having a microstructure layer, and the microstructure layer has a columnar structure. Taiwan Patent No. 1274896 discloses a light condensing sheet including a substrate and a plurality of curved, rod-shaped prism units. Taiwan Patent Publication No. 200712655 discloses an optical film having a surface with a plurality of irregular prism blocks. Taiwan Patent Publication No. 200819855 discloses an optical film, a surface of the optical film has a plurality of light guide microstructures, and each of the light guide microstructures has two peaks or more. U.S. Pat. No. 7,278,771 discloses an optical film, and a surface of the optical film has curved rod-shaped prism structures. U.S. Pat. No. 6,845,212 discloses an optical film, and a surface of the optical film has wave-shaped, rod-shaped prism structures.

Taiwan Patent Publication No. 200912390 discloses an optical film including a substrate and a plurality of rod-shaped prisms disposed on the substrate. Several sphere-like lenses are disposed on crest lines of the rod-shaped prisms, and the short diameter (the short axis) of each of the sphere-like lenses is greater than 1 µm and less than 60 µm. Taiwan Patent Publication No. 200707397 discloses an optical film, and the sides of a rod-shaped prism of the optical film have protruding particles. Taiwan Patent Publication No. 200811479 discloses an optical film, and a substrate of the optical film has a prism layer. The prism layer includes a plurality of rod-shaped prisms, and sides of each of the rod-shaped prisms have a plurality of micro-lenses. U.S. Patent No. 20090311486 discloses a prism sheet having a rod-shaped prism, and surfaces of the rod-shaped prism have diffusion particles.

SUMMARY OF THE INVENTION

The invention is directed to an optical film capable of mitigating at least one of a moiré phenomenon, a local adherence phenomenon, a scratching phenomenon, and a wearing phenomenon generated with other optical devices.

An embodiment of the invention provides an optical film including a light transmissive substrate, a plurality of strip protrusions, and a plurality of protruding structures. The light transmissive substrate has a first surface and a second surface opposite to the first surface. The strip protrusions are disposed on the first surface. Each of the strip protrusions has two strip surfaces. A crest line is formed at a junction of the two strip surfaces, and a valley line is formed between every two adjacent strip protrusions. The protruding structures are disposed on the crest lines of at least parts of the strip protrusions. Each of the protruding structures has a protruding end and two wing portions connected to the protruding end. The protruding end protrudes from the crest line of the corresponding strip protrusion. The two wing portions are respectively located on the two strip surfaces of the corresponding strip protrusion. Each of the wing portions extends from the protruding end to a place between the crest line and the valley line. A length of each of the protruding structures along a direction parallel to an extension direction of the crest line is L, a width of each of the protruding structures along a direction perpendicular to the crest line is W, and $L/W \geq 1.2$.

In summary, the optical film described in the embodiments of the invention has at least one of the following advantages. Since the optical film has the protruding structures protruding from the crest lines of the strip protrusions, or according to another embodiment, the average height of each of the strip protrusions of the optical film in a direction perpendicular to the second surface of the light transmissive substrate is at least partially different, regularity of the crest line and height uniformity of the strip protrusions may be broken. Accordingly, the moiré phenomenon occurring between the optical film and other optical devices may be reduced effectively, and the local adherence phenomenon occurring between the optical film and other optical devices may also be prevented. Besides, a light source module adopting the optical film described in the embodiments of the invention may provide a uniform planar light source, and a display apparatus employing the optical film described in the embodiments of the invention may ensure favorable quality of a display image. On the other hand, in the protruding structure described in an embodiment of the invention, the crest line segment of the protruding end is located on a plane substantially parallel to and not coincident with the surface of the light transmissive substrate facing away from the protruding structure. Hence, when the optical device is disposed on the optical film, the entire crest line segment of the protruding end of the protruding structure may effectively come into contact with the optical device, thus increasing the contact area between the optical device and the optical film. Moreover, the protruding end of each of the protruding structures is less likely to scrape or be scratched by the adjacent optical device.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTIONS OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
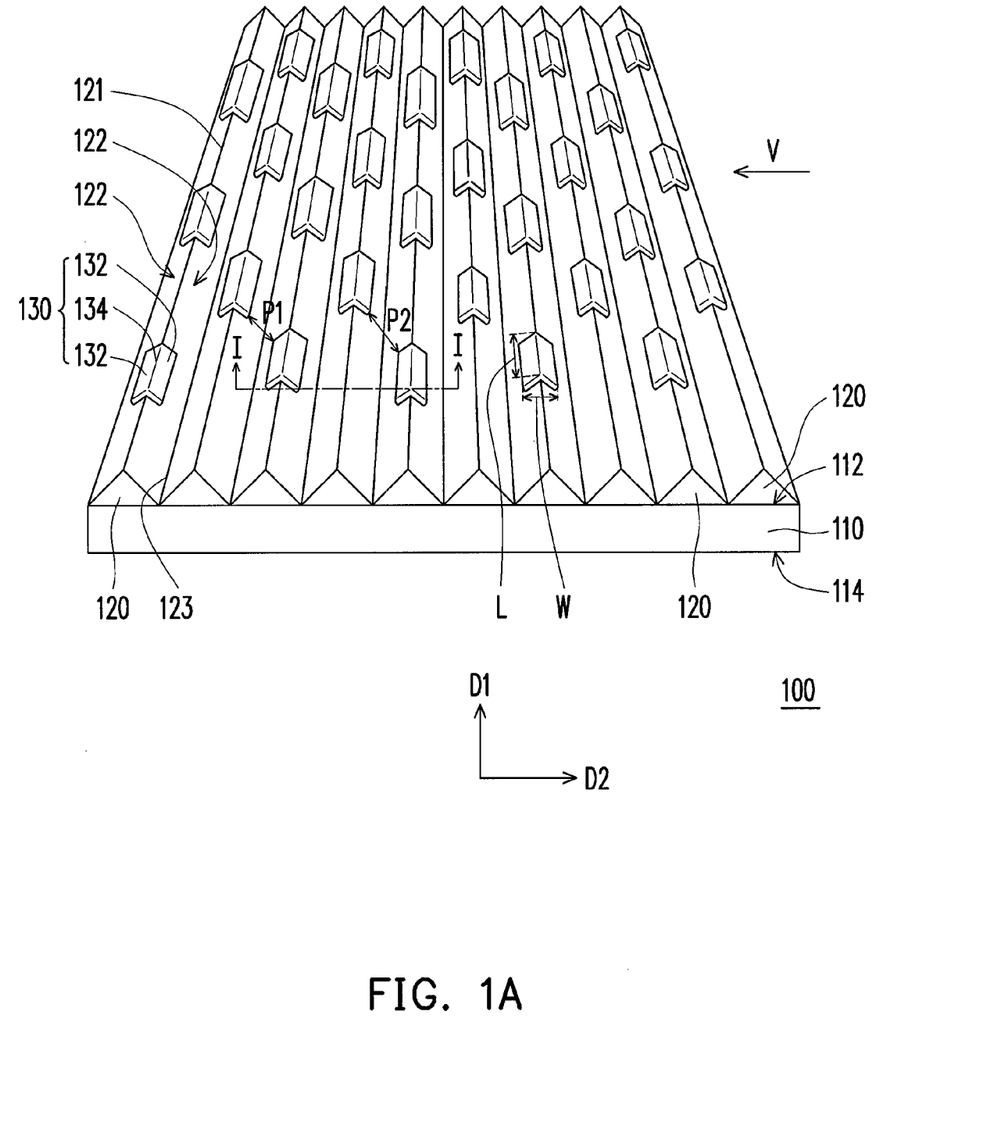
FIG. 1A is a perspective view of an optical film in accordance with an embodiment of the invention.
Figure 1B:
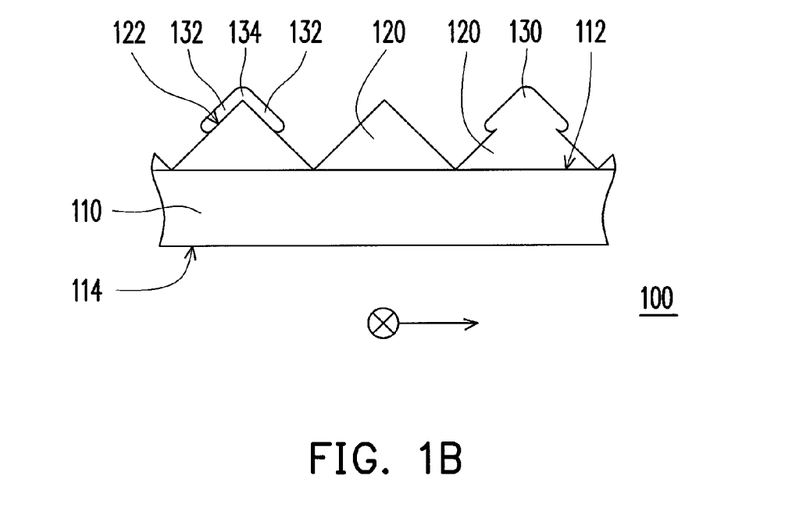
FIG. 1B is a cross-sectional view taken along a line I-I of the optical film depicted in FIG. 1A.
Figure 1C:
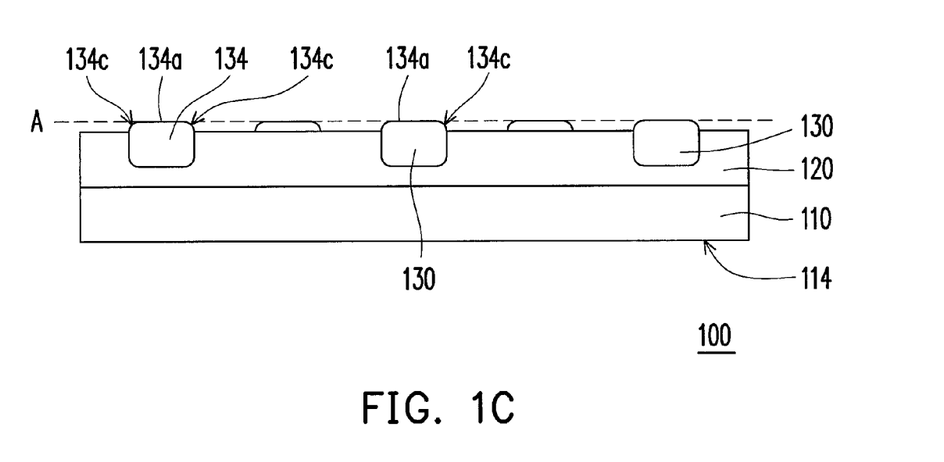
FIG. 1C is a side view illustrating the optical film depicted in FIG. 1A along a direction V.

With reference to FIG. 1A, FIG. 1B, and FIG. 1C, an optical film 100 of this embodiment is applicable to a backlight module of a liquid crystal display (LCD) or a light source module for enhancing the luminance of the light source module or the backlight module. Here, the backlight module includes a side type backlight module or a direct type backlight module. The optical film 100 of this embodiment includes a light transmissive substrate 110, a plurality of strip protrusions 120, and a plurality of protruding structures 130. The optical film 100, for example, is a BEF according to this embodiment.

The light transmissive substrate 110 has a first surface 112 and a second surface 114 opposite to the first surface 112. In this embodiment, the light transmissive substrate 110 is a transparent substrate, for instance. The strip protrusions 120 are disposed on the first surface 112. In this embodiment, each of the strip protrusions 120 extends along a first direction D1 and is arranged along a second direction D2. The first direction D1 is substantially perpendicular to the second direction D2 according to this embodiment. Each of the strip protrusions 120 has two strip surfaces 122. A crest line 121 is formed at a junction of the two strip surfaces 122, and a valley line 123 is formed between every two adjacent strip protrusions 120. In this embodiment, the strip protrusions 120 are transparent rod-shaped prisms, for instance.

The strip protrusions 130 are disposed on at least parts of the strip protrusions 120. In this embodiment, all of the strip protrusions 120 have the protruding structures 130 disposed thereon. However, in other embodiments, the protruding structures 130 may disposed on some of the strip protrusions 120 but not on the other strip protrusions 120. In this embodiment, the protruding structures 130, for example, are transparent protruding structures. Each of the protruding structures 130 has two wing portions 132 and a protruding end 134 connecting the two wing portions 132. The protruding end 134 protrudes from the crest line 121 of the corresponding strip protrusion 120. The two wing portions 132 are respectively located on the two strip surfaces 122 of the corresponding strip protrusion 120. Each of the wing portions 132 extends from the protruding end 134 to a place between the crest line 121 and the valley line 123 and protrudes from the corresponding strip surface 122. A length of the protruding structure 130 in a direction parallel to an extension direction of the crest line 121 is L, a width of the protruding structure 130 in a direction perpendicular to the crest line 121 is W, and L/W≧1.2. In this embodiment, the protruding end 134 has a crest line segment 134a, the crest line segment 134a is located on a plane A, and the plane is substantially parallel to and not coincident with the second surface 114 of the light transmissive substrate 110. Hence, when an optical device (not shown) is disposed on the optical film 100, the entire crest line segment 134a of the protruding end 134 in the protruding structure 130 may effectively come into contact with the optical device, thus increasing the contact area between the optical device and the optical film 100. Moreover, the protruding end 134 of the protruding structure 130 is less likely to scrape or be scratched by the adjacent optical device.

The crest line segments 134a of the protruding ends 134 in all of the protruding structures 130 are on the same plane A in this embodiment, while the crest line segments 134a of the protruding ends 134 in different protruding structures 130 may be located on different planes (not shown) in other embodiments. Note that each crest line segment 134a itself is entirely on the same plane. Moreover, these planes are all substantially parallel to but not coincident with the second surface 114 of the light transmissive substrate 110. In this embodiment, the crest line segment 134a is a part of the crest line of the protruding end 134, and portions 134c of the crest line of the protruding end 134 located at two ends of the crest line segment 134a are drooping, as indicated in FIG. 1C. However, in other embodiments, the crest line segment 134a may also be the entire crest line of the protruding end 134. Namely, the crest line segment 134a accounts for the whole crest line of the protruding end 134.

In this embodiment, the protruding structures 130 and the strip protrusions 120 are integrally formed, whereas the strip protrusions 120 and the light transmissive substrate 110 are formed individually. However, in other embodiments, the protruding structures 130, the strip protrusions 120, and the light transmissive substrate 110 may also be integrally formed. Alternatively, the protruding structures 130 and the strip protrusions 120 may be formed individually.

Since the optical film 100 of this embodiment has the protruding structures 130 protruding from the crest lines 121 of the strip protrusions 120, regularity of the crest lines 121 and height uniformity of the strip protrusions 120 may be broken. Accordingly, the moiré phenomenon occurring between the optical film 100 and other optical devices (e.g. a liquid crystal panel on the optical film 100) may be reduced effectively, and the local adherence phenomenon occurring between the optical film 100 and other optical devices (other optical films or liquid crystal panels) may also be prevented. Besides, a light source module adopting the optical film 100 described in this embodiment may provide a uniform planar light source, and a display apparatus (e.g. an LCD apparatus) adopting the optical film 100 may provide a display image of favorable quality. Moreover, the protruding structures 130 also protrude from the strip surfaces 122, and thus regularity of the strip surfaces 122 may also be broken to effectively reduce the moiré phenomenon. Further, both uniformity of the planar light source from the light source module and image quality of the display apparatus may be improved.

In addition, the protruding end 134 has a smooth profile at the crest line segment in this embodiment, such that the protruding end 134 is prevented from scratching or being worn by other optical devices (e.g. other optical films or display panels). Moreover, the protruding end 134 protrudes from the crest line 121. In other words, a height of the protruding end 134 in a direction perpendicular to the second surface 114 of the light transmissive substrate 100 is greater than the crest line 121. Therefore, the junction (i.e. at the crest line 121) of the two strip surfaces 122 of the strip protrudings 120 may be prevented from scratching or being worn by the adjacent optical devices (e.g. other optical films or display panels). In this embodiment, a peak of the protruding end 134 is at least 1 μm higher than a peak of the corresponding strip protrusion 120.

In this embodiment, the protruding structures 130 are separated from one another, and a pitch between every two adjacent protruding structures 130 is at least partially different. For example, as shown in FIG. 1A, a pitch P1 between two adjacent protruding structures 130 is not equal to a pitch P2 between another two adjacent protruding structures 130. Thereby, regularity of the protruding structures 130 may be reduced so as to mitigate the moiré phenomenon; furthermore, both uniformity of the planar light source from the light source module and the image quality of the display apparatus may be enhanced. In one embodiment of the invention, the pitch between every two adjacent protruding structures 130 may be randomly distributed in order to further reduce the regularity of the protruding structures 130. In this embodiment, the pitch between every two adjacent protruding structures 130 is greater than 30 μm.

Figure 2:
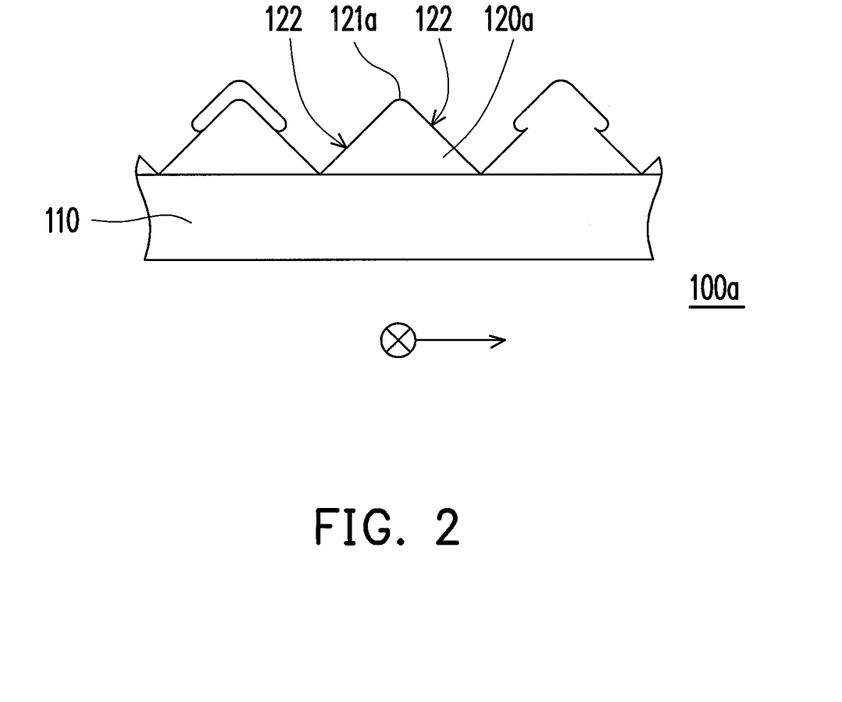
FIG. 2 is a cross-sectional view of an optical film in accordance with another embodiment of the invention.

An optical film 100a of this embodiment as shown in FIG. 2 is similar to the optical film 100 depicted in FIG. 1B, while the dissimilarities are described below. In the optical film 100a of this embodiment, the junction (e.g. at a crest line 121a) of the two strip surfaces 122 of the strip protrusion 120a is a round chamfer, thereby further reducing the possibility that the strip protrusion 120a scratches or is worn by an adjacent optical device.

Figure 3A:
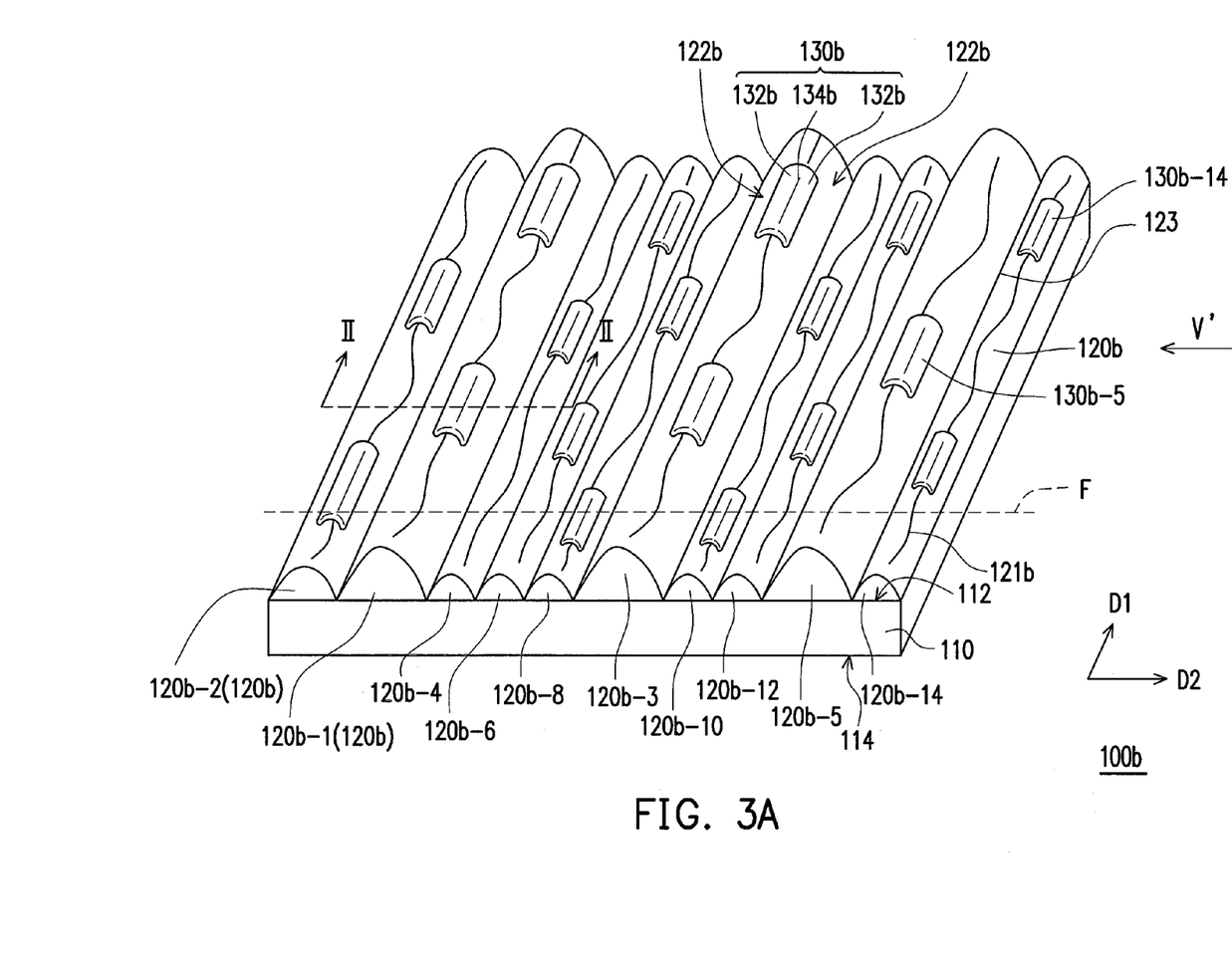
FIG. 3A is a three-dimensional view of an optical film in accordance with still another embodiment of the invention.
Figure 3B:
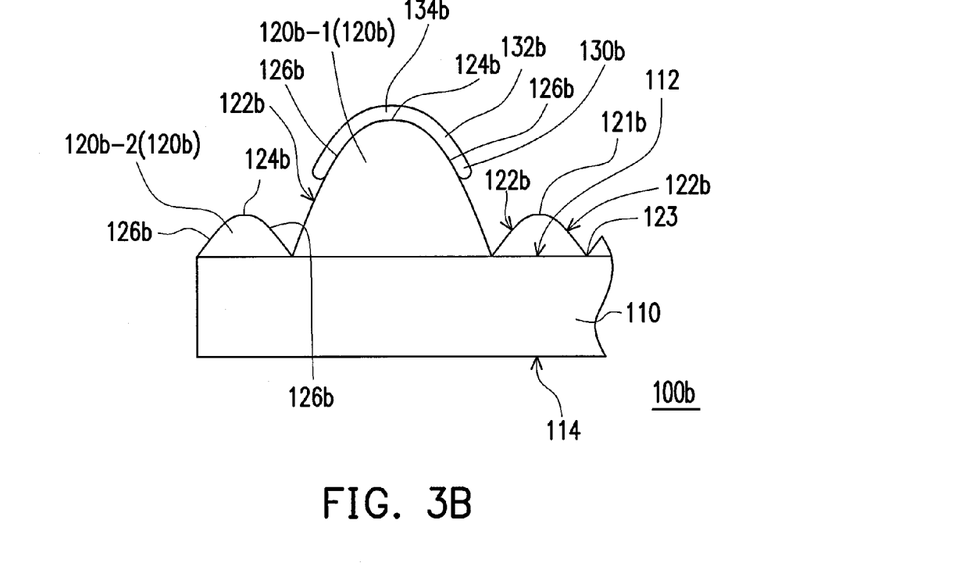
FIG. 3B is a cross-sectional view taken along a line II-II of the optical film depicted in FIG. 3A.
Figure 3C:
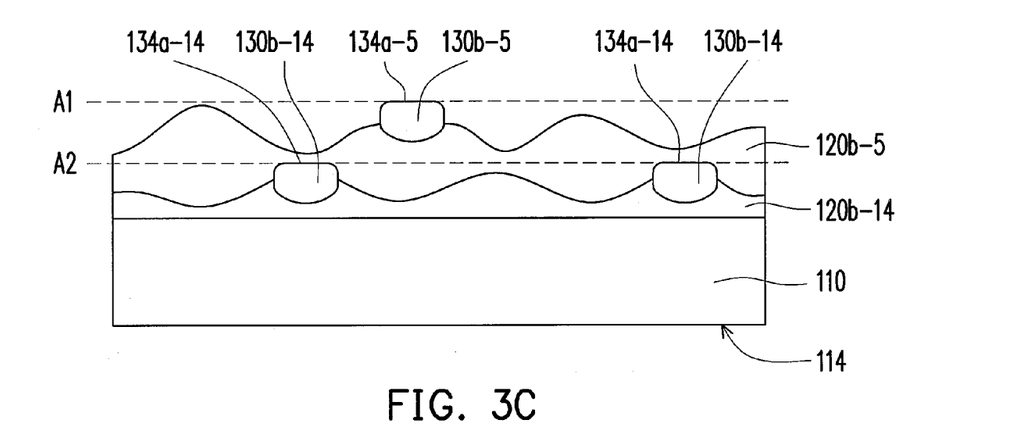
FIG. 3C is a side view illustrating the optical film depicted in FIG. 3A along a direction V'.

An optical film 100b of this embodiment as shown in FIG. 3A, FIG. 3B, and FIG. 3C is similar to the optical film 100 depicted in FIG. 1A, while the dissimilarities are described below. In the optical film 100b of this embodiment, a crest line 121b of each strip protrusion 120b rises and falls in a direction close to the light transmissive substrate 110 and a direction away from the light transmissive substrate 110. For example, the crest line 121b of each of the strip protrusions 120b rises and falls in a direction perpendicular to the second surface 114 of the light transmissive substrate 110, and the crest line 121b rises and falls relative to an extension direction (e.g. the first direction D1) of the strip protrusion 120b. Accordingly, the local adherence phenomenon occurring between the optical film 100b and other optical devices (e.g. other optical films or liquid crystal panels) may be effectively prevented. A light source module utilizing the optical film 100b may provide a uniform planar light source. Moreover, a display apparatus (e.g. an LCD apparatus) utilizing the optical film 100b may provide a display image of favorable quality.

Furthermore, in this embodiment, each of the strip protrusions 120b has a curved top 124b and two curved sides 126b on any cross-section perpendicular to the extension direction (e.g. the first direction D1) of the strip protrusions 120b. A radius of curvature of the curved top 124b is not equal to a radius of curvature of each of the curved sides 126b. According to this embodiment, the radius of curvature of the curved top 124b is smaller than the radius of curvature of each of the curved sides 126b, and the curved top 124b and the curved sides 126b protrude out of the strip protrusions 120b. However, in other embodiments of the invention, the curved top 124b may be replaced by a sharp corner, and the curved sides 126b may be replaced by linear sides.

Moreover, in this embodiment of the invention, an average height of the strip protrusions 120b in a direction perpendicular to the second surface 114 of the light transmissive substrate 110 is at least partially different. For example, the average height of the strip protrusion 120b-1 is greater than the average height of the strip protrusion 120*b*-2. As such, the possibility of the adherence phenomenon may be significantly lowered. Similar to the embodiment illustrated in FIG. 1A and FIG. 1B, in this embodiment, the wing portions 132*b* of each of the protruding structures 130*b* also extends from the protruding end 134*b* to the place between the crest line 121*b* and the valley line 123. The protruding end 134*b* protrudes from the crest line 121*b*, and the wing portions 132*b* protrude from the strip surfaces 122*b* of each of the strip protrusions 120*b*.

In this embodiment, each of the protruding structures 130*b* is disposed on a peak of the crest line 121*b* away from the light transmissive substrate 110. However, in other embodiments of the invention, at least parts of the protruding structures may be located on a valley of the crest line close to the light transmissive substrate.

In this embodiment, the maximum height of each of the strip protrusions 120*b* in a cross-section (e.g. a cross-section cut along a reference straight line F depicted in FIG. 3A and along a direction perpendicular to the second surface 114 of the light transmissive substrate 110) is alternately greater than and less than the average height of the strip protrusions 120*b* itself. Besides, the cross-section is not parallel to the extension direction (e.g. the first direction D1) of the strip protrusions 120*b*. The average height of the strip protrusion 120*b* refers to an average distance from the crest line 121*b* on the strip protrusion 120*b* to the second surface 114 of the light transmissive substrate 110. In this embodiment, the cross-section is substantially perpendicular to the extension direction of the strip protrusions 120*b*. Specifically, as indicated in FIG. 3A, the cross-sections cut along the reference straight line F are formed in sequence, from left to right, by a plurality of strip protrusions 120*b*-2, 120*b*-1, 120*b*-4, 120*b*-6, 120*b*-8, 120*b*-3, 120*b*-10, 120*b*-12, 120*b*-5, and 120*b*-14. The cross-sections of the strip protrusions 120*b* are respectively and alternately close to the peak and the valley of the respective crest lines 121*b* of the strip protrusions 120*b*. In this embodiment, taking the cross-section cut along the reference straight line F as an example, a cross-section of the strip protrusion 120*b*-2 is in proximity to the peak of the crest line 121*b* of the strip protrusion 120*b*-2. Therefore, the maximum height of the strip protrusion 120*b*-2 in the cross-section is greater than the average height of the strip protrusion 120*b*-2 itself. A cross-section of the strip protrusion 120*b*-1 is in proximity to the valley of the crest line 121*b* of the strip protrusion 120*b*-1. Therefore, the maximum height of the strip protrusion 120*b*-1 in the cross-section is less than the average height of the strip protrusion 120*b*-1. Moreover, a cross-section of the strip protrusion 120*b*-4 is in proximity to the peak of the crest line 121*b* of the strip protrusion 120*b*-4 itself. Therefore, the maximum height of the strip protrusion 120*b*-4 in the cross-section is greater than the average height of the strip protrusion 120*b*-4. A similar description may be given for other strip protrusions 120*b*. Moreover, as for the cross-sections parallel to the reference straight line F in this embodiment, the cross-sections of different prisms are respectively in proximity to the peaks or the valleys of the crest lines of the prisms themselves. The cross-sections of different prisms are alternately close to the peaks and the valleys. As such, the moiré phenomenon and the adherence phenomenon may be further suppressed.

In this embodiment, at least one of the strip protrusions 120*b* has an average height with a non-local maximum value, and the at least one of the strip protrusions 120*b* is disposed between any two adjacent strip protrusions 120*b* having an average height with the local maximum value. For example, the average height of each of the strip protrusions 120*b*-1, 120*b*-3, and 120*b*-5 has the local maximum value, whereas the average height of each of the strip protrusions 120*b*-2, 120*b*-4, 120*b*-6, 120*b*-8, 120*b*-10, 120*b*-12, and 120*b*-14 has the non-local maximum value. The strip protrusions 120*b*-4, 120*b*-6, and 120*b*-8 having the average height with the non-local maximum value are disposed between the strip protrusions 120*b*-1 and 120*b*-3 having the average height with the local maximum value. The strip protrusions 120*b*-10 and 120*b*-12 having the average height with the non-local maximum value are disposed between the strip protrusions 120*b*-3 and 120*b*-5 having the average height with the local maximum value. As such, the adherence phenomenon may be further suppressed.

On the other hand, the protruding structure 130*b*-5 on the strip protrusion 120*b*-5 has a crest line segment 134*a*-5, and the crest line segment 134*a*-5 is located on a plane A1 substantially parallel to and not coincident with the second surface 114 of the light transmissive substrate 110. Each of the protruding structures 130*b*-14 on the strip protrusion 120*b*-14 has a crest line segment 134*a*-14, and the crest line segment 134*a*-14 is located on a plane A2 substantially parallel to and not coincident with the second surface 114 of the light transmissive substrate 110. The planes A1 and A2 are substantially parallel to and not coincident with each other.

Figure 4A:
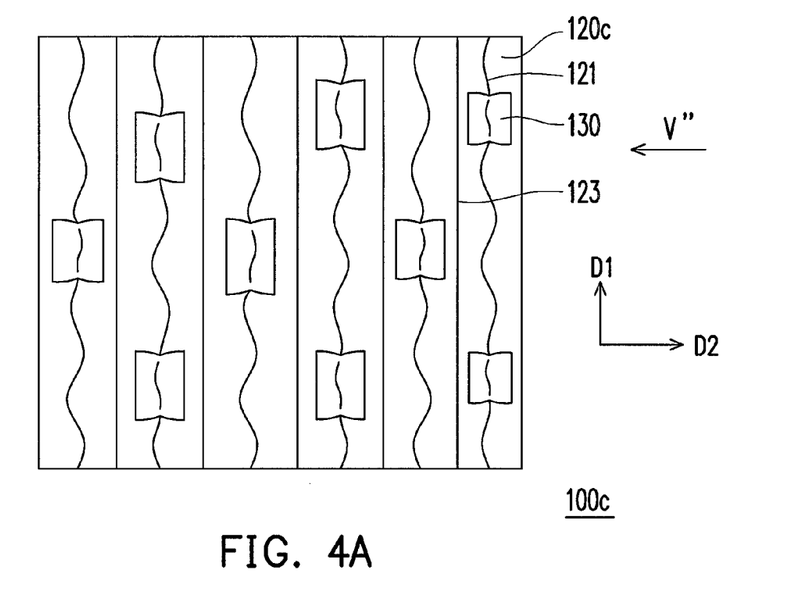
FIG. 4A is a top view of an optical film in accordance with still another embodiment of the invention.
Figure 4B:
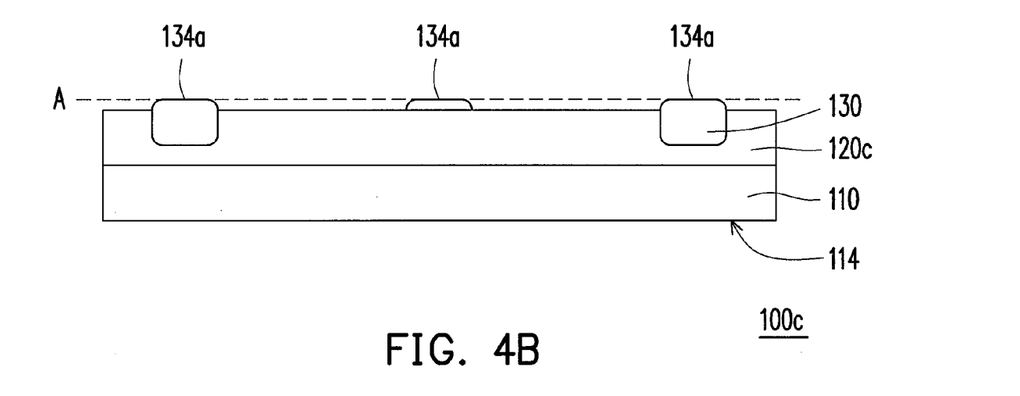
FIG. 4B is a side view illustrating the optical film depicted in FIG. 4A along a direction V".

An optical film 100*c* of this embodiment as shown in FIG. 4A and FIG. 4B is similar to the optical film 100 depicted in FIG. 1A, while the dissimilarities are described below. In the optical film 100*c* of this embodiment, the crest line 121 of each strip protrusion 120*c* curves left and right in a direction parallel to the second surface 114 (e.g. a direction parallel to the plane of the figure). Here, the second surface 114 is, for example, the second surface 114 of the light transmissive substrate 110 depicted in FIG. 1A. Thus, the moiré phenomenon may be effectively suppressed.

In this embodiment, the valley line 123 is linear, while the valley line 123 in other embodiments may curve left and right in a direction parallel to the second surface 114 of the light transmissive substrate 110. Additionally, in another embodiment of the invention, the crest lines of the strip protrusions not only may curve left and right as depicted in FIG. 4A but also may rise and fall as indicated in FIG. 3A. The crest line 121*b* depicted in FIG. 3A merely rises and falls but does not curve left and right. The valley line may merely rise and fall but not curve left and right; alternatively, the valley line may both rise and fall and curve left and right. On the other hand, the rising and falling or the curvature variation of the crest line of each of the strip protrusions may be consistent or inconsistent according to this embodiment.

In this embodiment, each of the protruding structures 130 on the strip protrusions 120*c* has a crest line segment 134*a*, and the crest line segment 134*a* is located on a plane A roughly parallel to but not coincident with the second surface 114 of the light transmissive substrate 110.

In light of the foregoing, the optical film described in the embodiments of the invention has at least one of the following advantages or effects. Since the optical film described in the embodiments of the invention has the protruding structures protruding from the crest lines of the strip protrusions, regularity of the crest lines and height uniformity of the strip protrusions may be broken. Accordingly, the moiré phenomenon occurring between the optical film and other optical devices may be reduced effectively, and the local adherence phenomenon occurring between the optical film and other optical devices may also be prevented. Besides, a light source module adopting the optical film described in the embodiments of the invention may provide a uniform planar light source, and a display apparatus adopting the optical film described in the embodiments of the invention may provide a display image of favorable quality. On the other hand, the protruding end of each of the protruding structures described in the embodiments of the invention has a crest line segment located on a plane roughly parallel to but not coincident with the surface of the light transmissive substrate, and the surface of the light transmissive substrate is away from the protruding structures. Hence, when an optical device is disposed on the optical film, the entire crest line segment of the protruding end in each of the protruding structures may effectively come into contact with the optical device, thus increasing the contact area between the optical device and the optical film. Moreover, the protruding end of each of the protruding structures is less likely to scrape or be scratched by the adjacent optical device. In addition, the surface of the protruding end in each of the protruding structures has a smooth profile, such that the protruding end is prevented from scratching or being worn by adjacent optical devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:
1. An optical film comprising:
a light transmissive substrate having a first surface and a second surface opposite to the first surface;
a plurality of strip protrusions disposed on the first surface, each of the strip protrusions having two strip surfaces, a crest line being formed at a junction of the two strip surfaces and the junction of the two strip surfaces of each of the strip protrusions is a round chamfer, a valley line being formed between every two of the strip protrusions adjacent to each other; and
a plurality of protruding structures disposed on the crest lines of at least parts of the strip protrusions, wherein each of the protruding structures has a protruding end and two wing portions connected to the protruding end, the protruding end protrudes from the crest line of the corresponding strip protrusion, the two wing portions are respectively located on the two strip surfaces of the corresponding strip protrusion, each of the wing portions extends from the protruding end to a place between the crest line and the valley line, a length of each of the protruding structures in a direction parallel to an extension direction of the crest line is L, a width of each of the protruding structures in a direction perpendicular to the crest line is W, and $L/W \geqq 1.2$, such that the contact area between an optical device and the optical film is increased.

2. The optical film as claimed in claim 1, wherein the protruding end has a crest line segment located on a plane, and the plane is substantially parallel to and not coincident with the second surface of the light transmissive substrate.

3. The optical film as claimed in claim 2, wherein the crest line segment of the protruding end has a smooth profile.

4. The optical film as claimed in claim 1, wherein the protruding structures are separated from one another, and a pitch between every two of the protruding structures adjacent to each other is at least partially different.

5. The optical film as claimed in claim 4, wherein the pitch between every two of the adjacent protruding structures is greater than 30 μm.

6. The optical film as claimed in claim 1, wherein the crest line of each of the strip protrusions rises and falls in a direction close to the light transmissive substrate and a direction away from the light transmissive substrate.

7. The optical film as claimed in claim 6, wherein the crest line of each of the strip protrusions curves left and right in a direction parallel to the second surface of the light transmissive substrate.

8. The optical film as claimed in claim 1, wherein the crest line of each of the strip protrusions curves left and right in a direction parallel to the second surface of the light transmissive substrate.

9. The optical film as claimed in claim 1, wherein a peak of the protruding end in each of the protruding structures is at least 1 μm higher than a peak of the corresponding strip protrusion.

10. The optical film as claimed in claim 1, wherein each of the wing portions protrudes from a corresponding strip surface.

11. The optical film as claimed in claim 1, wherein each of the strip protrusions is a rod-shaped prism.

12. The optical film as claimed in claim 1, wherein each of the strip protrusions has the crest line rising and falling in a direction close to the light transmissive substrate and a direction away from the light transmissive substrate, the crest line rises and falls relative to an extension direction of each of the strip protrusions, each of the strip protrusions has a curved top and two curved sides on any cross-section perpendicular to the extension direction of the strip protrusion, a radius of curvature of the curved top is not equal to a radius of curvature of each of the curved sides, and an average height of each of the strip protrusions in a direction perpendicular to the second surface of the light transmissive substrate is at least partially different.

13. The optical film as claimed in claim 12, wherein each of the protruding structures is disposed on a peak of the crest line away from the light transmissive substrate.

14. The optical film as claimed in claim 12, wherein a maximum height of each of the strip protrusions on a cross-section is alternately greater than and less than the average height of each of the strip protrusions, and the cross-section is not parallel to the extension direction of each of the strip protrusions.

15. The optical film as claimed in claim 12, wherein at least one of the strip protrusions has an average height with a non-local maximum value, and the at least one of the strip protrusions is disposed between any two of the adjacent strip protrusions having an average height with a local maximum value.

16. The optical film as claimed in claim 12, wherein the crest line of each of the strip protrusions curves left and right in a direction parallel to the second surface of the light transmissive substrate.

17. The optical film as claimed in claim 12, wherein the protruding structures are separated from one another, and a pitch between every two of the protruding structures adjacent to each other is at least partially different.

18. The optical film as claimed in claim 17, wherein the pitch between every adjacent two of the protruding structures is greater than 30 μm.

* * * * *